United States Patent [19]

Griffin

[11] 4,021,388

[45] May 3, 1977

[54] SYNTHETIC RESIN SHEET MATERIAL

[75] Inventor: Gerald Joseph Louis Griffin, London, England

[73] Assignee: Coloroll Limited, London, England

[22] Filed: Mar. 10, 1976

[21] Appl. No.: 665,418

Related U.S. Application Data

[60] Division of Ser. No. 527,038, Nov. 25, 1974, which is a continuation-in-part of Ser. No. 353,414, April 23, 1973, abandoned.

[30] Foreign Application Priority Data

May 18, 1972 United Kingdom ............ 23469/72
Nov. 28, 1973 United Kingdom ............ 55195/73
Mar. 7, 1974 United Kingdom ............ 10267/74

[52] U.S. Cl. .............................. 260/13; 260/17 R; 260/17.4 ST; 260/46.5 R; 260/23 XA; 260/23 S; 260/23 H; 260/18 TN; 260/DIG. 43; 526/1; 526/5

[51] Int. Cl.² ......................................... C08J 3/20

[58] Field of Search ............ 260/17.4 ST, 17 R, 13, 260/46.5 R, 23 XA, 23 S, 23 H, 18 TN, DIG. 43; 526/5, 1

[56] References Cited

UNITED STATES PATENTS 3,797,690 3/1974 Taylor et al. ............... 260/DIG. 43
3,867,324 2/1975 Clendinning et al. ...... 260/DIG. 43

OTHER PUBLICATIONS

Ind. Eng. Chem. Prod. Res. Develop., vol. 13, No. 2 pp. 123–125 Westhoff et al.
"Plastics" Oct. 1960 pp. 419–422 by Hueck.

*Primary Examiner*—Eugene C. Rzocidlo
*Attorney, Agent, or Firm*—Stevens, Davis, Miller & Mosher

[57] ABSTRACT

A biodegradable composition comprises a synthetic resin, a biodegradable granular filler such as natural starch and preferably a substance autoxidizable to yield a peroxide which attacks the carbon to carbon linkages in the resin.

5 Claims, No Drawings

SYNTHETIC RESIN SHEET MATERIAL

This is a division of application Ser. No. 527,038 filed Nov. 25, 1974, which in turn is a continuation-in-part of application Ser. No. 353,414 filed Apr. 23, 1973 now abandoned.

The present invention relates to a biodegradable product based on a synthetic resin, which composition combines the physical and chemical properties of the resin on which it is based with biodegradability. Biodegradability is the break down, ultimately to complete destruction as a result of the action of living micro-organisms such as bacteria and fungi and the enzymes which are substances intermediate in their metabolic processes. Biodegradation thus occurs in environments where such micro-organisms are present. Typically biodegradation occurs in an object which is in contact with soil, buried or partially buried.

Our application Ser. No. 353,414 of which this application is a continuation-in-part proposes a biodegradable product incorporating biodegradable particles constituted by natural starch granules. Such particles as well as being biodegradable should have small relatively regular granules, be heat stable and have relatively restricted water solubility in the natural state. However a moist environment is the most favourable for biological attack. Naturally occurring starch granules as set out in application Ser. No. 353,414 are the most appropriate biodegradable material but the present invention does not preclude the use of other materials having the properties set out above.

Thus the principal objective of the present invention is to provide a biodegradable product which combines the desirable properties of plastics i.e. strength, case of forming into desired shapes and resistance to chemical attack with significant biodegradability such that a product buried in the soil will degrade to destruction typically in 12 months. Thus products in accordance with the invention will make a significant contribution to the environment by reducing the disposal problem caused by chemically inert and bulk plastics.

A possible alternative to starch is a lactose sugar.

Our experimental observations suggest that although a product in accordance with our aforementioned earlier application constituting essentially of the relevant resin and the biodegradable filler will degrade in a satisfactory manner in municipal garbage disposal operations the biodegradation has not been so effective in natural soil. The present invention seeks not only to improve the biodegradability of the plastics-based material in municipal garbage disposal operations but also in natural conditions.

Starch-filler products as envisaged above achieve their biodegradability essentially by the filler particles exposed i.e. at or adjacent the surface initially being degraded and leached away followed successively by the degradation of particles at the interior to produce a cellular structure which is more readily attacked by the processes of oxidation, hydrolysis, direct enzyme action or combinations of these processes. The present invention seeks to achieve biological attack of the large stable molecules of the plastics. The characteristic that virtually all plastics share is a large number of carbon to carbon linkages. It is this structure which produces the desirable properties of the plastics.

The present invention provides a biodegradable product including a synthetic resin, a biodegradable filler and a material which in a natural environment oxidizes itself (autoxidises) to generate a peroxide which peroxide attacks the carbon to carbon linkages. Such a material should be physically and chemically compatible with the resin and commercially convenient and readily available materials which fullfill these conditions are the derivatives of unsaturated fatty acids which contain at least one double bond per molecule such a their alkyl esters or the natural fats themselves. The effectiveness of fats to achieve biodegradation is reinforced by our experience in municipal garbage disposal operations wherein there is a relatively high percentage of extractable oily matter.

The autoxidation of compounds such as fats can be catalysed by transition metals such as iron. In the soil burial situation such metals are available. We believe that the consequences of soil burial are firstly a reaction between the transition metal salts generally present in soil with fatty acid at the interface between the plastics-based composition and the soil, secondly a migration of the fat soluble transition metal salt of the fatty acid into the composition and thirdly, autoxidation of the salt thereby generating the peroxides and/or hydroperoxides which initiate the break down of the plastics molecules. Thus preferably the composition in the present invention includes as well as the fat or other autoxidisable substance a fatty acid to initiate the release of the iron salts for the autoxidation. The fat soluble transition metal salts can be preformed and included in the plastics based composition in accordance with the invention. However even without the specific inclusion of a fatty acid rancidity should generate fatty acid from a fat. The present invention is particularly applicable to thermoplastic resins such as flexible polyethylene and polypropylene packaging sheet which give rise to the greatest disposable problems. However the present invention is applicable to all plastics which include carbon to carbon linkages. Compositions based on polystyrene, polyvinyl chloride, and polyurethane are specifically envisaged.

Natural starch granules are the preferred biodegradable additives in compositions according to the invention. Starches are polysaccharide compounds which on hydrolysis produce sugars. More accurate definitions and discussions of the properties of starches can be found in the text book "Starch Chemistry and Technology" by Whistler-Pachall published by the Academic Press and in the book "The Starch Industry" by J. W. Knight published by the Pergamon Press. Multi-occupation starches such as rice and maize starches are preferred and, in order to optimise the starch concentration in a composition according to the invention, a mixture of two starches each having a different grain size is preferred. Thus, a mixture of rice and maize starch is most suitable. A multi-occupation starch is a starch in which more than one granule occupies the cell in which the starch is created. Such starches have granules of polyhedral form. In contrast single occupation starches are created as single granules, each in a cell, and have a smooth ovoid granule. The greater the starch concentration in the composition the greater the biodegradability. These properties increase progressively from a minimum of say 5% and we have found that a 15% starch/85% resin composition is satisfactory though higher starch concentrations up to say 50 % can advantageously be employed in certain circumstances. Generally however with a starch concentration of over 30% by weight the properties of the product will start to differ significantly from the plastics on which the composition is based In thermoplastic-resin-based compositions the starch granules will normally be mixed with the raw polymer during processing to prepare the raw polymer for moulding, extrusion or other fabrication procedure. Such procedures take place under relatively severe physical conditions i.e. at certain stages the composition is subjected to elevated temperatures and pressure. It has been found that natural starch granules survive these procedures. However if the polymerisation takes place under conditions such that the starch is not altered chemically or physically then the starch granules can be added to the monomer. An example of such a polymerisation is the production of polystyrene. As the polymerisation of the elastomers is a thermosetting process the starch must be added before polymerisation is complete.

As previously mentioned the present invention has an important application to the flexible packaging materials which are derived from thermo-plastic resins such as PVC, polyethylene and polypropylene resins. Such materials are flaccid, do not readily receive printed impressions, cannot readily be bonded by cold adhesives and cannot be handled by the transport mechanisms of paper-processing machines. Compositions in accordance with the present invention which include starch have, to some extent at least, the physical characteristics of paper i.e. the ability to hold a crease and to receive a printed impression, to be bonded using normal cold adhesive and to be successfully handled in paper-processing machinery. Sheets of the composition, moreover, have a reduced tendency to block i.e. to stick together when pressed together in machine handling operations.

In all the compositions in accordance with the invention treatment with hot water to gelatinize or dissolve surface starch granules renders the composition more paper-like.

With regard to the choice of fats and fatty acids for generating the peroxides or hydroperoxides by autoxidation the reaction mechanism depends on the presence of unsaturated linkages in the molecular structure of the fatty acids. Thus each molecule should contain at least one double bond and the commonest example of such a mono-olefinic unsaturated fatty acid is oleic acid. Where a greater speed of reaction is required fatty acids. with double or multiple double bonds, such as linoleic or linolenic acid should be selected.

One of the properties of starch is its chemisorbtion i.e. its ability to adsorb onto its surface chemicals thus the present invention envisages chemisorbing the fatty acids onto the surface of the starch which is then added to a composition, already including the fatty acid ester. Because fats i.e. the esters of the fatty acids are more physically compatible with the thermoplastics than free fatty acids it is advantageous to absorb the fatty acids onto the starch and to add the ester separately.

Typically in a composition according to the invention including also resin and a biodegradable additive there will be up to 2% by weight of combined fatty material i.e. fat and fatty acid. The fatty material will include typically 90% by weight fatty acid ester and 10% by weight fatty acid. It has been found that, in order to avoid blemishes in the finished product that it is essential to immobilise unconfined or free water in the starch or other additive. Any free water can generate steam at critical points in the manufacturing operation which results in porosity or reduction in strength by weakening the interface between the starch grains and the plastics material. In circumstances the intensive external drying required is either uneconomic or impossible, the invention provides the addition of dessiccating or moisture attracting agents capable of immobilising the unconfined water. Desiccating agents such as active silica and active alumina may act in a physical manner by the adsorbtion of the water into a porous structure. As an alternative desiccating agents may be employed which combine chemically with the water and in which case they are selected from classes of substances capable of reacting irreversibly at the temperature and pressure prevailing. Typical examples of such compounds are inorganic anhydrous salts such as calcium sulphate, alkaline earth oxides such as calcium oxide or water reactive organic compounds such as acid anhydrides, alkyl or aryl mono or poly isocyanates, or the reaction products of such isocyanates with phenols or hydroxylamines such reaction products being capable of regenerating the parent isocyanates at temperatures reached in the manufacturing operations. Particularly preferred compounds are those which will readily form ethers or esters with hydroxyl groups. Thus, for example, isocyanates or their derivatives and silicones react with hydroxyl groups in the starch itself at or near the surface of the grains thus reducing the hydrophyllic nature of the grain surface and increasing the strength of the starch/polymer bond. It has been found, specifically, that compositions including a silicone surface treated starch have very satisfactory physical strength. The invention provides accordng to another important aspect a starch/resin composition wherein the starch granules are surface treated with one of these substances.

There are many circumstances in which it is advantageous to provide a sealed container in which the interior space is maintained at a low moisture content. Typical applications would be the packaging of medical supplies or hygroscopic chemicals, photographic film, instruments or fine machinery liable to rust or corrode or explosives. In the last mentioned application the package can constitute the cartridge case or explosives-containing tube. It has been customary in such packages to include a separate loose dessicant such as a silica gel in a porous sachet. A packaging laminate including an inner film made according to the present invention obviates the need for the separate sachet as the dessicant in the form of starch granules can be incorporated into the film. An outer impervious skin, for example of aluminium foil is then incorporated.

The following examples further illustrate the invention.

EXAMPLE I

Composition incuding Polyolefin resin, starch, fatty acid ester and fatty acid 200 grams of maize starch which had been predried to 0.5% moisture content was tumble blended with 39 grams of ethyl oleate (prepared from technical grade oleic acid and with an iodine value between 75 and 84 and density between 0.869 and 0.874) and 1 gram of oleic acid (of iodine value between 85 and 90 and density about 0.891) and 160 grams of low density polyethylene film extrusion grade of density 0.920 and melt flow index 2. The resultant mixture was hot compounded on a 2 roll mill operating at 140°C at even speeds. The operation took approximately 10 minutes at the end of which time, the smooth creamy white compound was stripped from the mill as a hide, approximately 3 m.m. thick, cooled, and cut into cubes in a dicing machine. This composition was then used as a masterbatch in admixture with low density polyethylene of density 0.916 and melt flow index 1 in such ratios as to give 8% of starch in the final composition.

The blend of masterbatch and unfilled polymer was fed to a 45 m.m. single screw extruder with a screw of compression ratio 2.5 : 1 and L:D ratio of 20 : 1 and converted to blown film using conventional die and bubble haul off equipment with the final die temperature of 175°C. The product was a translucent flexible film having a falling dart impact strength of 220 grams, a tensile strength in the machine direction of 7.59 MN/m$^2$, and tensile strength in the transverse direction of 6.9 MN/m$^2$, a tear strength in the machine direction of 1.73 MN/m$^2$, and a tear strength in the transverse direction of 1.73 MN/m$^2$. These results can be compared with figures for film produced in the same run on the same machinery with the same polymer excluding the starch and other ingredients where the falling dart impact strength was 265 grams, the tensile strength in the machine direction 8.28 MN/m$^2$, the tensile strength in the transverse direction 5.52 MN/m$^2$, the tear strength in the machine direction 2.07 MN/m$^2$, the tear strength in the transverse direction 1.73 MN/m$^2$.

EXAMPLE II

Laboratory indication of the Biodegradability of Composition of Example I

Several sample squares of film, prepared as described in Example I, of about 5 centimetre side and 50 micron thickness were cut and placed side by side on a glass plate in an incubator. Half of the samples had been coated with a slurry of London clay. The incubator was maintained at a temperature of about 65°C for a period of one month as being typical of temperatures attained in the early stages of a composting process. The incubator was then switched off and the samples left in the dark at a room temperature of about 15°C for a period of 6 months at the end of which time the clay coated samples cracked when they were sharply bent by hand whilst the uncoated samples were not perceptibly different from samples which had been maintained at room temperature and in the dark for control purposes.

In a further trial polyethylene film samples made as described in Example I with the starch contents adjusted as listed in the table below were placed in a cylindrical aluminium drum of about 250 litre capacity the drum being situated with its long axis arranged horizontally and provided with a mechanism which rotated about the long axis very slowly. The drum was charged with about 20 kilograms of fresh screened compost taken from a 'Dano' composting plant operating normally in the vicinity of London on a mixture of domestic garbage and dewatered sewage sludge. The drum, which was in effect a miniature composting unit, was maintained at a temperature of 35°C ± 2°C by a combination of internal thermostat and an external bank of infra-red lamps. The moisture content of the charge in the drum was maintained at about 50% and free access of air assured by adequate ventilation. Samples of plastics film as described were withdrawn at monthly intervals and showed a considerable loss of tensile strength by the end of the second month followed after one further month by the appearance of numerous cracks which made further tensile testing impossible. More detailed results are given in the table below:

| Film sample identity | Initial tensile strength | Tensile strength after 65 days |
| --- | --- | --- |
| Blank, i.e. no starch or fatty acid derivative. | 8.55 MN/m$^2$ | 6.65 MN/m$^2$ |
| Generally as Example I but with 9% ww starch | 8.13 MN/m$^2$ | 6.13 MN/m$^2$ |
| Generally as Example I but with 23% ww starch | 7.3 MN/m$^2$ | 3.65 MN/m$^2$ |

EXAMPLE III

Composition including polystyrene thermoplastic resin, starch, fat and fatty acid.

300 grams of predried tapioca starch was tumble blended with 3000 grams of crystal polystyrene, 30 grams of pharmaceutical grade ethyle oleate and 3 grams of purified oleic acid. The whole blend was then hot compounded in a Francis Shaw type K1 internal mixer operating with 50 pounds steam pressure in its heating system. After hot compounding for six minutes the charge was dumped onto an 18 × 9 two roll mill preheated to 150°C and reduced to a thin hide which was subsequently pulverised to granular form and the granules fed to a single screw extruder of LD ratio 25:1 and screw diameter 45 mm with a two section screw allowing for venting volatiles from the barrel. The extrudate from this extruder was taken from a die yielding sheet material 0.7 mm thick and 250 mm wide which sheet was smooth surfaced and suitable for use in the thermoforming process used for the manufacture of thin walled packages and disposable drinking cups. Extrusion of sheet and tube was readily possible with compositions of the type described containing up to 30% by weight of starch and, making due allowance for increased melt viscosity, up to 50% by weight of starch could be included in compositions for extrusion or compression moulding.

EXAMPLE IV

Laboratory indication of biodegradability of Composition of Example III

A starch/polystyrene compound prepared as described in Example III so as to contain 50% by weight of starch was converted by the process of compression moulding into test pieces 80 mm long 12.7 mm wide and 1.5 mm thick which were tested according to the method of BS 2782 (1970) Method 302/D except that a support separation of 60 mm was used with a testing speed of 12 mm minute. The samples as prepared failed at a maximum fibre stress of 46.2(3) MN/m$^2$ and had an elastic modulus of 2,900 MN/m$^2$, but after immersion for ten days in 0.1% alphaamylase solution the strength had dropped to 21.8(9) MN/m$^2$ and the elastic modulus was down to 68.5 NM/m$^2$ indicating that the filled plastic was progressively attacked by the enzyme alpha amylase which is known to be produced by common soil micro-organisms, and the effect could also be followed visually by inspecting the broken surfaces of the test specimens.

EXAMPLE V

Composition containing polyethylene, lactose, fat and fatty acid 1,000 grams of granules of a low density polyethylene of Melt Flow Index 2 and density 0.918 were tumble blended with 200 grams of finely powdered dry lactose. 10 grams of pharmaceutical grade ethyl oleate, and 1 gram purified oleic acid. The resulting blend was hot compounded on a laboratory 2-roll mixing mill preheated to 135°C, giving a smooth white hide which was stripped from the mill and chopped into granules. The granulated compound was then hot pressed between polished steel plates to yield a smooth supple film about 0.25 mm thick.

EXAMPLE VI

Laboratory indication of biodegradability of Composition of Example V

Samples of film made as described in Example V were placed in the laboratory rotating compost unti as described in Example II, after 70 days the samples displayed cracks and brittleness along with discolouration indicative of colenisation by bacterial growth.

EXAMPLE VII Composition containing polyolefin, starch, fatty acid ester, and desiccant A composition was prepared as described in Example I except that the oleic acid was omitted and the starch used was a maize starch of about 2% moisture content and the starch concentration was 9% by weight. Attempts to extrude thin blown film from this composition failed because the product was disfigured and weakened by the presence of numerous small bubbles created by the conversion of the free moisture to steam at the moment of issue of the plastics melt from the mouth of the extrusion die. When the same composition was extruded after the addition of a sufficient amount of a master batch compounded separately from equal weights of 5 micron mean diameter calcium oxide powder and low density polyethylene such as to ensure the presence of one percent by weight of calcium oxide in the final extruded composition then the extrusion became perfect in that it was free from bubbles. It was necessary to omit the oleic acid to avoid reaction with the calcium oxide.

EXAMPLE VIII

Composition (as Example I) including polyolefin, starch, fatty acid ester, fatty acid, but with the starch modified by silicone treatment 1200 grams of maize starch of about 12% moisture content was suspended in 4 liters of water with continuous agitation and to this suspension was added 43.2 grams of a 49% ww solution of a sodium alkyl siliconate sold as a proprietary composition by the Dow Corning Company as 'DC 722'. The pH of the starch slurry was then adjusted to 8.5 by the addition of dilute acid and the slurry then dried by feeding it to a small spray drying plant of conventional design working with an air inlet temperature of 190°C and an air outlet temperature of 60 to 70°C., the powdery product being kept in circulated hot air oven at 80°C until its moisture content was 1% or less. The resultant highly water repellent starch was used to produce a starch/low density polyethylene master batch exactly as described in Example I and this master batch in turn used to make extrusion-blown film. Polyethylene film produced in the manner described in Example I and containing 9% ww starch in a polymer of Melt Flow Index 2 and density 0.918 grams per cubic centimetre showed on testing a tensile strength of 14.4 MN/m$^2$ and a falling dart impact strength of 70 grams at a film thickness of 50 microns as measured by a screw micrometer. When a film containing 9% ww of silicone treated starch was tested under identical conditions the tensile strength was found to be 15.2 MN/m$^2$ and the falling dart impact strength 80 grams. This increase in tensile strength is manifest in resin/starch compositions irrespective of whether the autoxidisable substance is present.

EXAMPLE IX

Dessicating Packaging Film

An aluminium foil laminate was prepared in a conventional manner by extruding a coating of low density polyethylene of MFI 7 and density 0.917 grams per cubic centimetre between webs of bleached kraft paper of 50 gsm substance and aluminium foil, this laminate being then passed again through the extrusion coating plant the outer aluminium surface was extrusion coated with a layer of starch/low density polyethylene composition formulated as described in Example I except that the starch content was adjusted to 30% ww. The quadruple layer paper/polyethylene/ aluminium/starch-polyethylene laminate was converted into flat packets, or sachets, approximately 100 mms square by the process of heat sealing together the starch containing layers. It is evident by calculation that the inner lining of these sachets contains 0.3 grams of starch and this starch has had its moisture content reduced in manufacture to less than one percent. Taking 15°C and 60% Relative Humidity as being very common conditions for the atmosphere we know that such air will contain 7.92 grams of water per cubic metre and therefore the walls of the sachets as described are capable of drying 379 cubic centimetres of air for every 1% increase in the water content of starch. Experimental information is available (Hellman, Boesch, & Melvin, J.A.C.S. Volume 74, P.348) which establishes that even after taking up 4.53% of moisture at 25°C the atmosphere in equilibrium with maize starch has only 8% relative humidity, and tests conducted by sealing deliquescent or moisture sensitive materials in the sachets made as described in this example indicate that the considerable reserve of drying power in the inner coating has reduced the water content of the small volume of free air sealed inside to a very low level.

EXAMPLE X

Long Term tests of Biodegradability

Multiple samples of sheet materials prepared in accordance with the foregoing examples were buried on the 20the day of November 1974 2 cms below the surface of three types of burial material specified below in trays maintained at approximately 50% moisture content by regular watering held in a conventional horticultural greenhouse set aside for experimental work, regular log of soil temperature being kept. The three types of burial material were:

1. garden loam recovered from land, originally agricultural, in the County of Middlesex, England, screened through a coarse sieve to remove stones larger than about 6 mm diameter, 2. Beech forest, surface soil obtained from Burnham Beeches, Buckinghamshire, England, and screened through a coarse sieve to exclude particles larger than about 6 mm in diameter, 3. screened compost made in a 'Dano'continuous composting plant working on a blend of municipal garbage and de-watered sewage, taken fresh from the discharge screen of the plant and adjusted to correspond to the average composition of raw compost before entering the plant according to analysis quoted on page 501 of 'Handbook of Environmental Control'- Volume II Ed. by R.G.Bond and published by CRC Press, Cleveland, Oh., U.S.A. by additions of sugar, starch, and vegetable cooking oil.

All the samples were carefully characterised physically before burial and corresponding control samples maintained in sealed dry containers in the dark it being proposed to unearth the buried samples one year from the date of internment and repeat the physical characterisation on both sets with a view to making the results public in an appropriate manner. Control samples of unmodified resins were also buried.

The following further two examples illustrate biodegradable compositions including resin and starch granules.

EXAMPLE XI: PREPARATION OF A THERMOPLASTIC-RESIN-BASED COMPOSITION

A masterbatch was prepared by blending together on a laboratory 2-roll mill heated by steam at 140 psig pressure equal weights of low density polyethylene and a starch blend. The polyethylene used was Alkathene Q1388 made by I.C.I. Ltd., which has a density of .920 g/ml at 23° centigrade and a M.F.I. of 2 when measured according to method 105C of B.S. 2782, and the starch blend comprised equal parts by weight of maize starch and rice starch. The masterbatch material as cut from the mill was reduced to granule form in a dicing machine and blended cold with granules of the unmodified polyethylene and fed to an extruder set up for the manufacture of layflat blown polyethylene film using a typical die and pinch rolls and haul-off equipment of conventional form. The starch content of the resulting blown film was adjusted to various concentrations between 5 and 15%, the effect of the added starches being more evident at the higher concentrations in that the film showed no signs of blocking, was slightly more hazy to visual inspection, and had a feel and crease retention much more paper-like that the unmodified polyethylene film at similar thickness. Blocking is the local sticking together of films pressed together, particularly in the nip of a pair of rollers.

EXAMPLE XII: PREPARATION OF A THERMOSETTING-BLASTOMED BASED COMPOSITION 200 grams of Daltorol PR1, a low molecular weight polyester resin manufactured by I.C.I. Ltd., and 200 grams of a mixture of equal parts of refined maize starch and rice starch, were blended together by mechanical stirring in a glass vessel under a reduced pressure of 30mm Hg. The temperature of the mixture was raised to 105 degrees centigrade and maintained at that level for approximately 30 minutes in order to remove free moisture from the ingredients. After reducing the temperature to 70° Centigrade 20 grams of Suprasec SFN, a blend of 2,4- and 2,6-tolylene diisocyanate manufactured by I.C.I. Ltd., was added and stirring continued for 2 minutes at atmospheric pressure followed by 10 minutes under vacuum as before in order to remove entrapped air during which operations the temperature of the mix remained between 70 and 75° Centigrade largely due to the evolution of heat by the chemical reaction taking place between the polyester and the di-isocyanate. At the conclusion of the mixing and de-acrating process, the syrupy product was poured onto plane horizontal surfaces which had been precoated with a suitable release agent, usually polytetrafluorethylene, and finally oven cared at 110 degrees centigrade for 3 hours. In a variation of the procedure the syrupy composition was spread with a steel blade onto the surface of 71 g/m² white bond paper and then subjected to the same oven cure. The unsupported starch filled rubber samples were smooth and supple and substantially free from bubbles or agglomerates of filler, the addition of the starch made no significant difference to the curing reaction or time although the tear strength of the finished rubber, as judged manually, was rather low. The coated paper samples were completely permeated by the starch/polyurethane rubber because of the low viscosity of the prepared syrup and the resultant composite was strong and impermeable to water and gases. A further interesting advantage of using starch granules as a filler in polyurethane based compositions is the relatively small loss in strength that is involved. This is illustrated in the following further examples:

EXAMPLE XIII: COMPOSITION INCLUDING POLYURENTHANE

Equal weight of a thermoplastic polyurethane resin manufactured by the Bayer Chemical Co. under the typecode of Desmopan 385 and pre-dried maize starch were hot-mixed together on a laboratory 2-roll mill steam heated at approximately 100 psi steam pressure. The sheet of material stripped from the mill was cut into small granules and blended with further Desmopan 385 so as to give a final starch concentration of 31% by weight and this blend was then converted by the process of extrusion blowing into sheet material 0.15 mm thick the product being smooth and very soft. The tensile strength of this product measured following the procedure of ASTM D 638-64T, was 16.0 MN/m² as compared with 18.5 MN/m² tensile strength measured on the thermoplastic polyurethane without starch. The loss in strength caused by starch addition being only 13.5% and thus surprisingly low for such a high concentration of filler, by way of comparison a composition of PVC and plasticiser of similar softness filled to the same degree showed a strength loss of 49.4%.

EXAMPLE XIV: LABORATORY INDICATION OF BIODEGRADABILITY OF COMPOSITION OF EXAMPLE XIII

Sample of sheet thermoplastic polyurethane containing 31% maize starch prepared as described in Example XIII were partly buried in boxes of garden soil and kept at 20°C in a humid atmosphere. After 2–3 weeks a network of fungal hypha could be seen at the junction of the soil and the emerging samples and after 6 weeks the protruding ends fell onto the sail surface having broken away from the buried portions at the time it was not possible to recover the buried samples other than in fungus riddled fragments.

I claim:

1. A biodegradable composition including a polymer having carbon to carbon linkages and dispersed therein from 5.5% to 50% by weight of starch granules, the surface of said granules being modified by reaction with a compound which reacts with hydroxyl groups to form an ether or an ester.

2. The composition of claim 1 wherein the said compound reacted with the said particle is an isocyanate.

3. The composition of claim 1 wherein the said compound reacted with the said particles is a silicone.

4. The composition of claim 1 containing from 2% to 5.5% by weight of a substance which autoxidizes to generate a peroxide or a hydroperoxide, said substance being selected from the group consisting of a fatty acid, a fatty acid ester, a natural fat and mixtures thereof.

5. The composition of claim 1 wherein the synthetic resin is polystyrene, polyvinyl chloride or polyurethane.

* * * * *